US008099966B2

(12) United States Patent
Mossberg et al.

(10) Patent No.: US 8,099,966 B2
(45) Date of Patent: Jan. 24, 2012

(54) SYSTEM AND METHOD FOR CONTROLLING AN ENVIRONMENT IN AN AIRCRAFT USING A VORTEX COOLER

(75) Inventors: Robert E. Mossberg, Wichita, KS (US); Charles B. Beuning, Wichita, KS (US)

(73) Assignee: Textron Innovations Inc., Providence, RI (US)

( * ) Notice: Subject to any disclaimer, the term of this patent is extended or adjusted under 35 U.S.C. 154(b) by 991 days.

(21) Appl. No.: 11/582,675

(22) Filed: Oct. 18, 2006

(65) Prior Publication Data

US 2008/0271465 A1     Nov. 6, 2008

(51) Int. Cl.
F25B 9/02     (2006.01)

(52) U.S. Cl. ................................. 62/5; 62/239

(58) Field of Classification Search .................. 62/5, 239
See application file for complete search history.

(56) References Cited

U.S. PATENT DOCUMENTS

| 2,586,002 | A | | 12/1952 | Carson, Jr. et al. |
| 2,644,315 | A | * | 7/1953 | Jamieson ............................ 62/5 |
| 2,737,028 | A | * | 3/1956 | Machlanski ........................ 62/5 |
| 2,819,590 | A | * | 1/1958 | Green ................................. 62/5 |
| 2,904,965 | A | * | 9/1959 | Green ................................. 62/5 |
| 2,917,288 | A | | 12/1959 | Sims, Jr. et al. |
| 2,920,457 | A | * | 1/1960 | Bartlett, Jr. ......................... 62/5 |
| 2,952,981 | A | * | 9/1960 | Bartlett, Jr. ......................... 62/5 |
| 3,026,681 | A | * | 3/1962 | Green ................................. 62/5 |
| 3,144,754 | A | * | 8/1964 | Tilden ................................ 62/5 |
| 3,165,149 | A | * | 1/1965 | Raible et al. .................. 165/263 |
| 3,311,161 | A | | 3/1967 | Glaspie |
| 3,537,644 | A | | 11/1970 | Davison |
| 3,630,040 | A | * | 12/1971 | Goldfarb ............................. 62/5 |
| 3,667,241 | A | * | 6/1972 | Munding et al. ................... 62/5 |
| 4,240,261 | A | * | 12/1980 | Inglis ................................. 62/5 |
| 4,333,754 | A | * | 6/1982 | Peter ................................. 62/5 |
| 4,397,154 | A | | 8/1983 | Bowers, Jr. |
| 5,010,736 | A | * | 4/1991 | York et al. ......................... 62/5 |
| 5,461,868 | A | | 10/1995 | Finko |
| 5,682,749 | A | | 11/1997 | Bristow et al. |
| 6,128,907 | A | * | 10/2000 | Mori ................................. 62/5 |
| 6,334,841 | B1 | | 1/2002 | Letourneur |
| 2004/0216468 | A1 | | 11/2004 | Hatcher |
| 2005/0257533 | A1 | | 11/2005 | Gunawardana et al. |

FOREIGN PATENT DOCUMENTS

JP     03114557 A     5/1991

OTHER PUBLICATIONS

International Search Report and Written Opinion dated Feb. 27, 2008, issued in related PCT Patent Application Serial No. PCT/US2007/081762.

* cited by examiner

*Primary Examiner* — Cheryl J Tyler
*Assistant Examiner* — John Pettitt
(74) *Attorney, Agent, or Firm* — Lathrop & Gage LLP

(57) ABSTRACT

Disclosed is an air conditioning system for an aircraft which utilizes high pressure bleed air. The bleed air is pressure controlled and introduced into a vortex cooler which can be operated in two modes using a valve. In a first mode, the bleed air is divided into cold and hot streams. The cold stream is directed into the cabin for cooling purposes. The hot stream is released from the aircraft in a manner that it pulls ambient air across a heat exchanger. In a second mode, the bleed air is not divided, but passes through the vortex cooler as a common stream. The second mode is more commonly used in colder ambient air conditions.

16 Claims, 2 Drawing Sheets

SYSTEM AND METHOD FOR CONTROLLING AN ENVIRONMENT IN AN AIRCRAFT USING A VORTEX COOLER

BACKGROUND OF THE INVENTION

1. Field of the Invention

The present invention relates to the field of controlling the environment in the cabin or other locations in an aircraft. More specifically, the present invention relates to systems and methods for controlling cabin temperatures where high pressure air is bled from the engine of the aircraft for the purpose of maintaining cabin pressure.

2. Description of the Related Art

Cabin pressures in some aircraft have traditionally been maintained by bleeding high pressure air from the compressor section of a gas turbine engine on the aircraft. The high pressure of this bleed air is ramped down using a flow control valve consisting of a pressure regulator and a flow control nozzle. The bleed air is then introduced into the cabin at a constant flow rate. To ensure that desired cabin pressure limits are not exceeded, the cabin includes one or more electronically controlled pressure relief valves which release cabin air to control cabin pressure to a predetermined level. Thus, the cabin pressure is maintained constant.

Although these traditional arrangements adequately handle cabin pressures, climate control problems result. Bleed air temperatures are normally very high, and thus, the bleed air must be cooled in order to maintain cabin air temperatures at pleasant levels.

One conventional approach is to dispose of heat using a heat exchanger in the bleed air passageway which runs from the engine to the cabin. This heat exchanger, however, is useful only when the aircraft is in flight because it draws ram air from an air scoop on the outside of the aircraft. When the aircraft is stationary, the scoop provides no forced air. Thus, the heat exchanger will have no effect because there is no cross flow.

When in flight in cold ambient temperatures, these conventional arrangements can effectively maintain temperatures in the cabin. On hot days, however, a separate air conditioning system must be used to further cool the cabin below ambient temperatures. This is because the heat exchanger is dependent on outdoor temperatures for cooling. Thus, where outside temperatures are above what is desirable, this air as a cooling medium for the heat exchanger is not sufficient to cool the bleed air running through the exchanger. And the problem is even greater when the aircraft is on the ground and no ram air is available.

Because the heat exchanger alone is not able to handle all possible environmental conditions, a separate air conditioning system is normally provided to maintain cabin temperatures. In most cases a vapor cycle cooling system is used. This added equipment requires extra space, adds weight to the aircraft, and is very expensive. On hot days—especially when the aircraft is stationary, the air conditioning system for the aircraft is greatly burdened, and the vapor cooling systems also require significant electrical energy. Thus, there is a need in the art for a system that overcomes these and other deficiencies in the conventional arrangements.

SUMMARY OF THE INVENTION

The disclosed embodiments provide systems and methods. In one embodiment, a system is disclosed. The system is used for controlling at least one condition in a substantially enclosed environment. The system includes a high-pressure air source and a mechanism adapted to control a supply airflow from the high pressure air source. The system includes an air pressure regulator attached to a flow limiting nozzle. In certain embodiments, the flow limiting nozzle mechanism is a vortex tube, also known as a vortex cooler. The high pressure air source is regulated to a lower stable pressure which is then presented to the fixed nozzle area of the orifice/nozzle in the inlet of the vortex cooler. The concept of a constant pressure air source feeding a fixed flow area orifice provides a constant air flow for the cabin.

In another embodiment, a system is disclosed. The system is used for controlling at least one condition in a substantially enclosed environment. The system includes a regulated-pressure air source and a mechanism adapted to receive a supply airflow from the regulated pressure air source. In certain embodiments, the mechanism is a vortex tube, also known as a vortex cooler. The system is operable in at least two modes. A first mode in which the mechanism divides said supply airflow into a hot stream and a cold stream, and a second mode in which the supply air is released from the mechanism in an undivided common stream. The substantially-enclosed environment, e.g., an aircraft cabin, is adapted to receive the cold stream when the system is being operated in the first mode. But the substantially-enclosed environment receives the undivided common stream when said system is in said second mode.

In another embodiment, the system includes a heat exchanger which receives, cools, and then exhausts said airflow. The heat exchanger is adapted to receive cooling air, and then release said cooling air from an exhaust duct. The hot stream is introduced into said exhaust duct in a direction away from said exchanger. This creates a vacuum in the exhaust duct which draws said cooling air across said exchanger even if said aircraft is not in flight.

In another embodiment, the hot air stream, upon leaving said vortex cooler, is directed into a conduit. This conduit, in certain embodiments, is adapted such that, when open, it causes the system to be in the first mode, and when closed, causes said system to be in the second mode.

Also disclosed is a related method of maintaining temperatures and pressures in a substantially enclosed environment. One embodiment for this method comprises bleeding high-pressure air from a high-pressure air source. This embodiment includes at least two modes of operation. A first mode comprises (i) receiving the high-pressure air into a mechanism, (ii) dividing the high pressure air into hot and cold streams using the mechanism, and (iii) releasing the cold stream into the substantially enclosed environment. A second mode comprises (i) receiving the high-pressure air into the mechanism, (ii) releasing the high-pressure air from the mechanism in an undivided common stream, and (iii) introducing the high pressure air into the substantially enclosed environment.

DETAILED DESCRIPTION OF THE INVENTION

It is known to use high-pressure bleed air for purposes of maintaining cabin pressures. As disclosed herein, the source of high pressure air is reduced to a regulated value by a pressure regulator. The regulated pressure air is utilized by a mechanism (a vortex tube in the preferred embodiment) which limits the flow of bleed air available to the cabin for cabin pressure control.

This source of regulated pressure air is utilized by a mechanism (a vortex tube in the preferred embodiment) which divides the air into hot and cold streams when in a first mode of operation for cabin temperature control. The cold steam is transmitted to the cabin of the aircraft whereas the hot stream is released via a valved conduit into an exhaust duct of a ram-air heat exchanger. When in this first mode, the mechanism is able to create a 50° F. drop in temperature from the initial temperature of the pressurized air. Thus, the system is normally placed in first mode (by opening the valve in the hot air conduit) when the aircraft is being operated in hotter outdoor environmental conditions.

The system is also operable in a second mode which is more commonly used in colder environmental conditions for cabin temperature control. The system is placed in second mode by shutting the valve in the hot-stream conduit. Once the hot-stream conduit is closed off, the high-pressure air introduced into the mechanism is released into the cabin without being divided into separate streams. This enables the pressurized air to be introduced without experiencing the 50° F. temperature drop caused by first-mode operation.

Because the valve control system provides an optional 50° F. temperature drop, the two modes of operation along with the ram-air heat exchanger, are able to adequately regulate cabin temperatures without the use of any separate air conditioning system.

This greatly reduces equipment costs, reduces aircraft weight, saves electrical energy, and improves cabin climate control.

Figure 1:
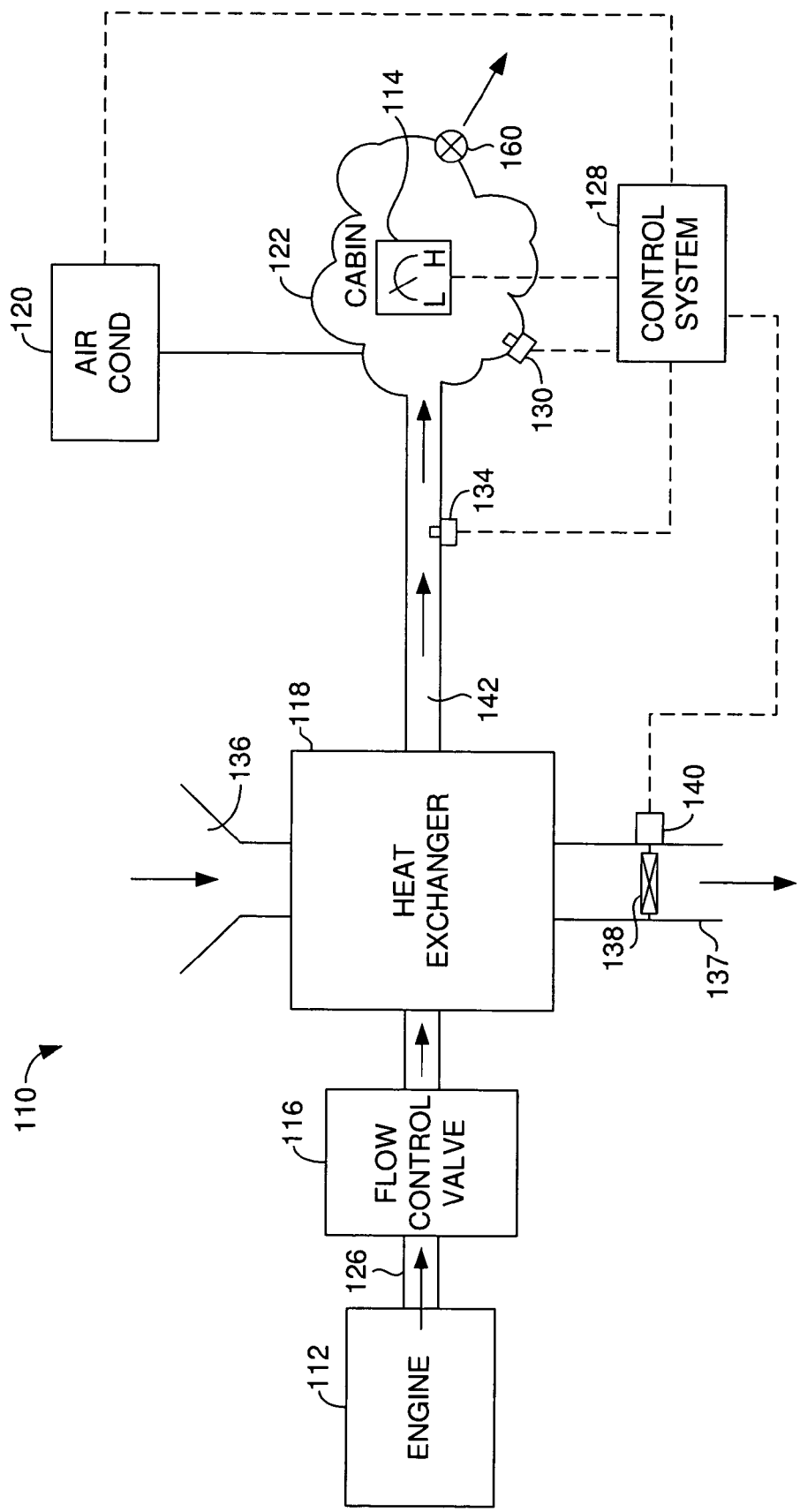
FIG. 1 is a schematic of a prior art system.

FIG. 1 discloses a conventional arrangement 110 for maintaining pressures and temperatures inside a cabin 122 of an aircraft. As can be seen from the figure, compressed bleed air is derived from an engine 112. Engine 112 is a gas turbine. Gas turbines compress air, add fuel, and then combust the fuel-air mixture to propel the aircraft. The FIG. 1 system provides a duct 126 which receives the high-pressure air from the compressor section of the turbine 112 in a manner well known to those skilled in the art. Once the high-pressure air is received into duct 126, a flow control valve 116 is used to regulate the pressure and limit the airflow before the air is introduced into a heat exchanger 118. The bleed air pressure will typically have to be reduced significantly—to 20-30 psig above cabin pressure in the preferred embodiment for conditions ranging from Idle power pressures of 40 psig to Take Off power pressures of 350 psig. Pressure regulators are able to receive inconsistent, fluctuating high pressure air and output air at a lower constant pressure. Thus, the regulator portion of 116, eliminates any erratic high pressures from the compressor section and delivers the bleed air into the flow limiting nozzle at constant pressure level. The nozzle portion of 116 limits the air flow based on the regulated pressure and thus serves as a flow control device.

After passing through exchanger 118, the bleed air enters a cabin supply duct 142. The pressure in duct 142 is reduced, but is high enough that cabin 122 can be maintained in a pressurized state with a constant supply of air. Excessive pressures in cabin 122 are relieved using a pressure relief valve 160. Pressure relief valve 160 will release air as necessary to maintain cabin 122 at a constant pressure as desired. Thus, controlled pressurization in cabin 122 is accomplished using the combination of the flow control valve 116 and the pressure relief valve 160.

The temperature in cabin 122 in these conventional systems is partially maintained using heat exchanger 118. Typically, exchanger 118 is a cross-flow heat exchanger. Cross-flow heat exchangers receive cooling medium from an air scoop 136. When the aircraft is in flight, scoop 136 draws in high-pressure ambient air ("ram air") from outside the aircraft, pushes it across exchanger 118. The ram air is then vented from an exhaust duct 137. The cross flow of the ram air through exchanger 118 cools the high pressure bleed air from the engine. Once it has been cooled and introduced into duct 142 at reduced temperature, the bleed air is introduced into cabin 122.

The cooling effect of exchanger 118 is flight-condition dependent. When the aircraft is stationary, there will be no ram air available from scoop 136, and the exchanger will provide no cooling effect. When the aircraft is in flight, however, the cross flow of ram air is substantial and made to be variably controllable using an actuator 140 to butterfly valve 138.

In some cases it will be desirable to maximize the cooling of the bleed air (e.g., on a hot day where ambient temperatures are elevated). In others, little or no cooling will be required (e.g., cold days, or after climbing to altitudes where ambient temperatures are lower).

In colder ambient conditions, cabin temperatures are maintainable by controlling heat exchanger 118 by varying the cross flow of ram air using butterfly valve 138 when the craft is in flight. In these situations, bleed air temperatures in duct 126 are reduced only to the extent that the proper temperatures are maintained in cabin 122.

When the aircraft is stationary in colder ambient conditions, a separate air conditioning system 120 may be required to effectively control temperatures in the cabin because exchanger 118 will not have cross flow to adequately reduce temperatures. But the demand on the air conditioning system 120 will not be that great.

When the aircraft is in flight where the outside conditions are warmer, the heat drop made possible by heat exchanger 118 is insufficient (even if butterfly valve 138 is completely open) to adequately cool the air delivered to duct 142. Because of this, air conditioning system 120 must be relied on heavily. As is known, cabin vapor cycle cooling systems like system 120 add undesirable weight, equipment costs, and electrical power requirements to the aircraft. But these systems are necessary to cool the bleed air in the FIG. 1 arrangement because the ambient air received through scoop 136 and exhausted through duct 137 will not sufficiently drop temperatures in duct 142—even when valve 138 is completely open. Thus, air conditioner 120 is critical to maintaining proper cabin temperatures with the FIG. 1 system.

In terms of controls, the conventional system uses a controller 128. Controller 128 may be a micro computer, programmable logic controller or even a smaller scale device. As can be seen from FIG. 1, the control system 128 receives a temperature setting from an indicator 114. Once this setting has been received, system 128 receives information from a temperature sensor 130 in the cabin and a determination is made whether the cabin is above, below or at the desired temperature selected on indicator 114. If the desired temperature is less than the sensed temperature, control system 128 will send a signal to actuator 140 causing butterfly valve 138 to be more closed. This will raise the temperature at temperature sensor 134 introduced in duct 142 so that the cabin temperature is increased until it meets the indicated temperature on device 114.

If the temperature detected by sensor 130 is greater than the temperature selected on indicator 114, control system 128 will cause actuator 140 to open up butterfly valve 138 to a greater extent. This increases the ram air cross-flow through exchanger 118, thus reducing the bleed air temperatures in duct 142.

In situations where butterfly valve 138 has been completely opened by control system 128 and the air introduced into cabin 122 through duct 142 is still at too high a temperature, control system 128 activates air conditioning system 120 to provide the necessary cooling to the cabin 122.

Figure 2:
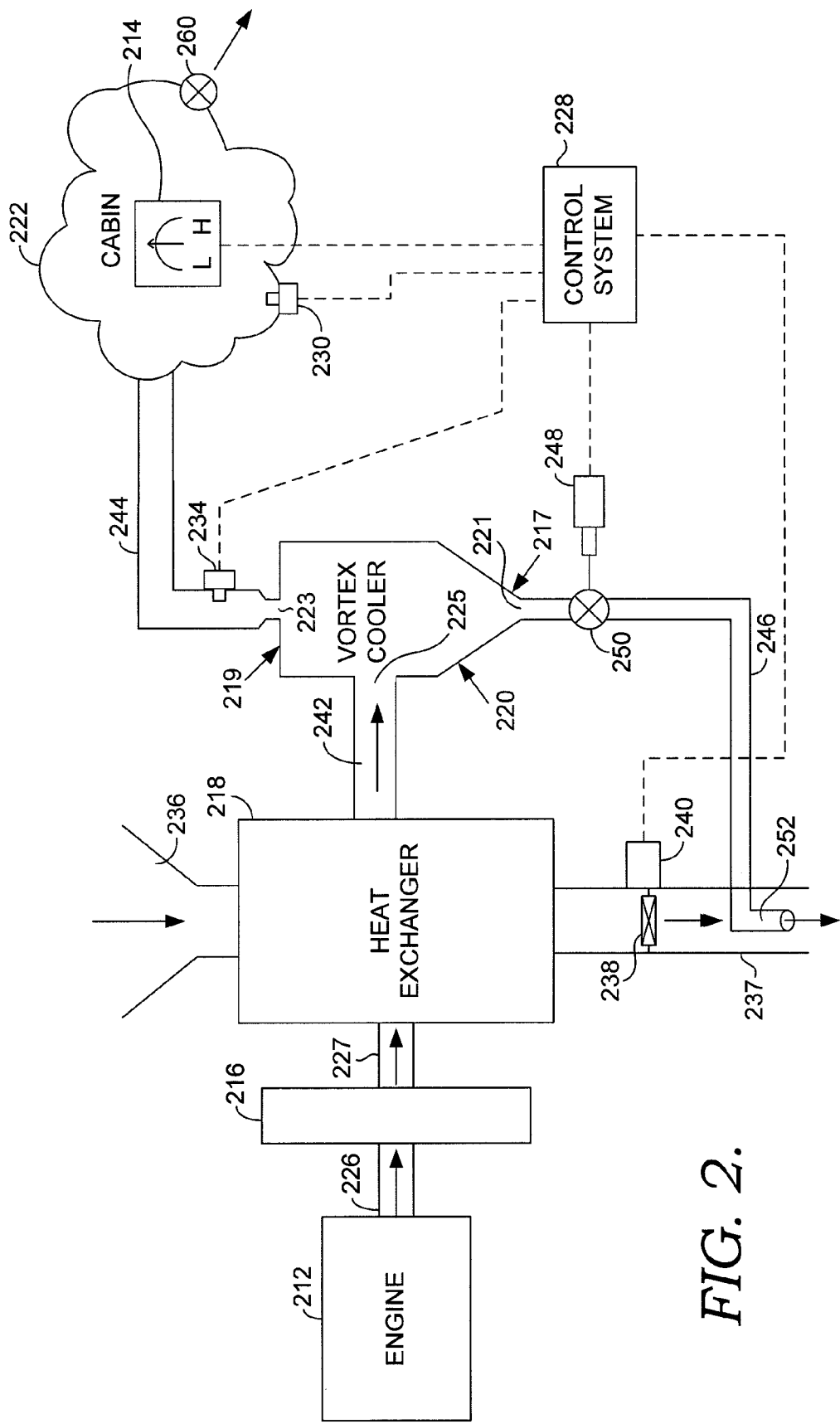
FIG. 2 is a schematic showing one embodiment of the system of the present invention.

FIG. 2 discloses an arrangement which overcomes the deficiencies in the prior art systems. Like with the prior art systems disclosed in FIG. 1, the FIG. 2 system disclosed here receives bleed air from the compressor section of an engine 212 into a duct 226. Unlike the conventional systems, however, the FIG. 2 system then presents the bleed air to a pressure regulator 216. The bleed air pressure will typically have to be reduced significantly—to 20-30 psig above cabin pressure in the preferred embodiment for conditions ranging from Idle power pressures of 40 psig to Take Off power pressures of 350 psig. Pressure regulators are able to receive inconsistent, fluctuating high pressure air and output air at a lower constant pressure. Thus, regulator 216, eliminates any erratic high pressures from the compressor section and delivers the bleed air into heat exchanger 218 at constant pressure level. Regulator 216 does not include a nozzle and thus does not serve as a flow control device.

After the pressure regulator, the bleed air is introduced into a heat exchanger 218. Like with the heat exchanger in the conventional systems, heat exchanger 218 receives ram air from a scoop arrangement 236 when the aircraft is in flight. The ram air then flows through exchanger 218 where it serves as a cooling medium, and then out an exhaust duct 237. Thus, as the bleed air is received from duct 227 into heat exchanger 218, it is cooled down and then passes into a duct 242.

After the bleed air leaves heat exchanger 218 via duct 242, it is introduced into a mechanism 220. Mechanism 220 is capable of splitting the bleed air into hot and cold streams when it is activated (in a first mode of operation). In the preferred embodiment, the mechanism used in system 220 to divide the bleed air into separate streams is a vortex tube, which is also referred to as a vortex cooler. Vortex tubes are inexpensive, maintenance free devices that receive compressed air in a single stream and creates two output streams. One of the out streams is hot and the other is cold. These kinds of devices typically have no moving parts, do not require the use of any refrigerant, do not consume electricity, are relatively light weight and are also small in size. Functionally speaking, transition from single to separate cold and hot streams occurs almost instantly. Further, vortex tubes require no maintenance and are very durable.

When in active mode, compressed air regulated to a constant pressure level by the regulator 216, and cooled by heat exchanger 218, enters the vortex cooler 220 through a supply orifice/nozzle 225. The nozzle 225 portion of 220 limits the air flow based on the regulated pressure and thus serves as the system air flow control device. The air exits nozzle 225 at high velocity and is directed tangentially into the cooler vortex spin chamber. This causes the air stream to revolve around in the vortex spin chamber and move toward a hot end 217. Once at hot end 217, the outer stream of air escapes through an aperture 221 in the hot end side 217 and into a hot stream conduit 246.

The air not ejected from hot end 217, is forced up back through the center of the outer spinning vortex. As it is moving axially back through the vortex cooler towards a cool end 219, the inner stream gives off heat to the outer stream. After it has traveled the full length of the device, it is ejected from a nozzle 223 in the cold end 219 of the vortex tube as cold air into a cool stream duct 244.

Nozzle 225 of the vortex cooler is the air flow limiting component in the supply air system. As will be recalled from above, a pressure regulator 216 is able to reduce and level off bleed air pressures to 20-30 psig above cabin pressure, then the vortex cooler nozzle 225 limits the quantity of air flow to the cabin, and finally, at least one pressure relief valve is included in the cabin to control the release of cabin air. The reason that regulator 216 reduces pressures to around 20-30 psig is to allow approximately 20 psig for the vortex cooler to operate while allowing the maximum level of pressurization, required when the aircraft is at ceiling altitudes of approximately 8-10 psig. Thus, the pressure regulation components are able to provide adequate pressure at any altitude.

With the use of a vortex cooler, a temperature drop is always available to the system. With the FIG. 2 embodiment, e.g., a 50° F. drop is enabled. The 50° F. differential is taken from the temperatures in duct 242 versus the temperatures in cool stream conduit 244. The cool stream will be used to cool the cabin when the system is in first, active mode so that it can be used to cool cabin 222. Because the air exiting the vortex cooler 220 in duct 244 is approximately 50° F. cooler than the air introduced in duct 242, a tremendous cooling boost is realized. And this additional cooling reduces or eliminates the need for the use of any separate air conditioning system (like vapor cooling system 120 in FIG. 1).

The FIG. 2 embodiment also uses a control system 228. This automated control system could comprise a computer, a micro controller, a programmable logic circuit, mechanically activated arrangement or other type of control device or system. Control system 228 makes use of a temperature sensor 234 in duct 244, a temperature sensor 230 in cabin 222, and a temperature indicator 214. Temperature indicator 214 enables a user to make a temperature setting for the cabin. Signals conveying the setting made are then received by control system 228, which acts to bring the actual cabin temperatures close to the set temperature.

In order to meet these objectives, control system 228 is able to selectively activate a mode-switching valve arrangement. The valve arrangement includes an actuator 248 and a poppet valve 250. Control system 228 is able to open or shut poppet valve 250 by either activating or deactivating actuator 248. When ambient temperatures are warmer, the poppet valve will typically be opened to provide additional cooling, and the system will operate in a first mode. When ambient temperatures are colder, the system operates in a second mode in which poppet valve 250 is closed. Closed status is desirable because the temperature drop available from the vortex cooler is unnecessary in colder ambient conditions.

It will now be discussed in detail how the control system functions to accommodate situations where the aircraft is stationary or in flight, and also where ambient temperatures are cold or hot.

When the Aircraft is on the Ground

In situations where the aircraft is still on the ground, elevated temperatures will be sensed in duct 244 by sensor 234—even on cold days. The elevated temperatures are substantially due to the fact that no ram air is available from air scoop 236 because the aircraft is not in flight. With no ram air, heat exchanger 218 will ordinarily be completely ineffective. But with the system here, once elevated readings from sensor 234 are detected, the control system 228 causes actuator 248 to open up valve 250, placing the system in a first mode. In first mode the vortex cooler splits bleed air received through duct 242 into hot and cold streams. The hot stream leaves the vortex cooler 220 through orifice 221 and travels through hot stream conduit 246. At the end of conduit 246, an induction mechanism 252, which in the preferred embodiment, is a curved elbow portion 252, ejects the hot air at high pressure and velocity out of the exhaust duct 237 away from heat exchanger 218. When the hot air is released out of elbow portion 252 downstream, suction is created behind it. This suction, when butterfly valve 238 is opened using actuator 240, pulls air across exchanger 218 even if the aircraft is stationary and not receiving ram air. This provides the cooling medium necessary for exchanger 218 to selectively change bleed air temperatures using butterfly valve 238 even though the aircraft is not in flight—unlike conventional systems.

Because the cool stream temperatures will be at significantly lower temperatures than the bleed air received (50° F. lower in the preferred embodiment) the system is able to provide the cooling necessary even in the hottest ambient air conditions and can provide a 50% increase in cooling capacity.

Whereas the vortex cooler contributes a constant temperature drop, heat exchanger 218 fine tunes the temperatures in response to readings made by control system 228. More specifically, control system 228 is able to keep temperatures sensed in the cabin by sensor 230 at or near the temperature selected on indicator 214 by automatically opening up butterfly valve 238 using actuator 240 when the sensed temperature is above the selected temperature, reducing the cross flow when the sensed cabin temperatures are below the selected temperature.

In Flight in Hot Ambient Conditions

When the aircraft is in flight in hot ambient conditions, e.g., on a warmer day at low altitudes, the system will also be in first mode where valve 250 remains open and thus, the vortex cooler divides the bleed air into hot and cold streams. Although heat exchanger 218 is now receiving ram air, and is able to somewhat reduce temperatures in the cabin, the exchanger alone will not be able to adequately reduce temperatures to the point that they are desirable. Even when control system 228 has opened valve 238 completely and thus, the cooling effect of the exchanger is maximized.

If the system is not already operating in first mode, elevated temperatures sensed in duct 244 (or cabin sensor 230) will indicate to the control system that poppet valve 250 needs to be opened to provide further cooling ability. When this occurs, the bleed air will be divided into hot and cold streams, and the vortex cooler will provide the temperature drop necessary to adequately cool the cabin. In order to accurately match the desired temperature, the butterfly valve 238 will be caused by control system 228 to variably open up and close in response to temperature readings received from sensor 234 and cabin sensor 230. This enables the cross flow across the exchanger to dictate bleed air temperatures which meet the cooling objectives in the cabin. And the cooling boost provided by vortex cooler 220 avoids the use of any additional cooling system like is necessary with the prior art systems.

For example, with a conventional FIG. 1 system on a hot day where ambient temperatures are at 105° F., a typical bleed air temperature is around 450° F. in duct 126. (This contemplates the possible use of other heat reduction equipment provided proximate the engine). Under these circumstances, the use of heat exchanger might be able to reduce temperatures to about 115° F. in duct 142. These elevated temperatures will then have to be reduced using an air conditioning system either in duct 142 or in cabin 122 to maintain acceptable temperatures.

But with the FIG. 2 arrangement, after the 450° F. bleed air is dropped to 115° F. by heat exchanger 218 and released into duct 242, it is then divided by vortex cooler 220 into the hot and cold streams. The cold stream, which is directed into conduit 244, accounts for 60% to 80% percent of the supply flow, and will have a temperature that is about 65° F., which is 50° F. lower than the bleed air supplied. The hot stream, which is diverted into conduit 246, and will account for about 20% to 40% of the supply flow of bleed air, will be at a temperature of about 165° F., or 50° F. higher than the supply flow temperature.

Because the system is capable of delivering 65° F. air even when ambient temperatures are extremely high, e.g., 105° F., acceptable conditions are maintainable in cabin 222 without additional air conditioning system capacity.

In Flight in Cold Ambient Conditions

The operation is different if ambient outdoor temperatures outside are cooler, e.g., on a cold day or at high altitudes. Where control system 228 detects temperature readings from sensors 234 and 230 which are lower than the temperature selected on indicator 214, and if butterfly valve 238 has already been completely closed off, this is an indication that outside ambient temperatures are so low that the temperature drop provided by vortex cooler 220 is unnecessary. When control system 228 senses this, it will close valve 250 using actuator 248. This completely closes off duct 246 and essentially takes vortex cooler 220 out of operation in terms of splitting hot and cold flows. Thus, all of the flow through duct 242 would be exhausted through orifice 223. Although orifice 223 does effect some pressure drop, the air temperature is unaffected and the temperature of the air introduced into duct 244 is substantially equal to that presented into duct 242. Because the vortex cooler has no cooling effect, the bleed air can be used to heat the cabin 222. Further, if control system 228 senses that incremental temperature changes are necessary, these changes can be made by selectively causing butterfly valve 238 to become more open or more closed in response to sensed temperatures. Thus, the control system 228 is able to precisely control cabin temperatures even in cold conditions.

Regardless of the mode of operation, the presence of the vortex cooler in the overall system enables provision of a significant temperature drop in the bleed air. Because of this temperature drop, additional air conditioning equipment is unnecessary, and incremental changes in cabin temperature can be accomplished using butterfly valve 238 regardless of what mode the system is in.

As can be seen, the present invention and its equivalents are well-adapted to provide a new and useful system for controlling an environment in an aircraft using a valved vortex cooler. Many different arrangements of the various components depicted, as well as components not shown, are possible without departing from the spirit and scope of the present invention.

The present invention has been described in relation to particular embodiments, which are intended in all respects to be illustrative rather than restrictive. Alternative embodiments will become apparent to those skilled in the art that do not depart from its scope. Many alternative embodiments exist but are not included because of the nature of this invention. A skilled artisan may develop alternative means of implementing the aforementioned improvements without departing from the scope of the present invention.

It will be understood that certain features and subcombinations are of a utility nature and may be employed without reference to other features or subcombinations and are contemplated within the scope of the claims. Not all steps listed in the various figures need to be carried out in the order described.

The invention claimed is:

1. A system for controlling air temperatures in a pressurized cabin in an aircraft, said system comprising:
a passageway for receiving a supply of pressurized air from an engine, and directing said air through a pressure regulator;
a heat exchanger disposed in said passageway for reducing temperatures in said supply air received through said pressure regulator using available ram air as a cooling medium when the aircraft is in flight, and the cooling medium also being compellable through said exchanger by suction created in an exhaust duct of the heat exchanger regardless of whether ram air is available, the suction pulling the cooling medium through the exchanger;
a temperature-maintaining valve in the exhaust duct of the heat exchanger for controlling the exit temperature of the supply air from the heat exchanger so that when the supply air is received in the cabin the supply air will be at a desired temperature setting;
a splitter device for dividing said supply of pressurized air into a hot stream and a cold stream; said splitter device having a supply orifice which limits airflow, and thus, along with said pressure regulator, maintains a constant rate of airflow into said pressurized cabin for substantially all modes of operation;
a first conduit for receiving said cold stream from the splitter device and directing said cold stream into said pressurized cabin at a substantially constant rate; and
a second conduit for receiving said hot stream from the splitter device and then using an elbow to direct said hot stream out of the ram air exhaust duct creating the suction that causes the cooling medium to be drawn across the heat exchanger regardless of whether the aircraft is in flight;
a mode-control valve in said second conduit having an open mode in which flow is allowed from the splitter device through the second conduit in a manner in which divides said supply airflow into a hot stream and a cold stream;
a closed mode for said mode-control valve in the second conduit wherein the supply airflow is released into the cabin as an undivided stream; and
a relief valve in said cabin for maintaining a constant pressure in the cabin.

2. The system of claim 1 wherein said splitter device is a vortex tube.

3. A method of maintaining temperatures and pressures in a substantially enclosed environment, said method comprising:
bleeding high-pressure air from a high-pressure air source; and
providing a first mode of operation and a second mode of operation;
said first mode comprising (i) controlling the pressure of said high-pressure air source, (ii) receiving said high-pressure air into a mechanism, (iii) dividing said high pressure air into hot and cold streams using said mechanism, and (iv) releasing said cold stream into said substantially enclosed environment;
said second mode comprising (i) controlling the pressure of said high-pressure air source, (ii) receiving said high-pressure air into said mechanism, (iii) releasing said high-pressure air from said mechanism in an undivided common stream, and (iv) introducing said high pressure air into said substantially enclosed environment;
maintaining a constant air flow rate into said substantially enclosed environment during both of said first and second modes of operation by leveling off the air pressure before the high pressure air reaches the cabin using a pressure regulation device and then by sizing a supply orifice of said mechanism; and
continually releasing air from the substantially enclosed environment such that a constant pressure is maintained in the environment.

4. The method of claim 3 comprising:
using a heat exchanger to precision control said temperatures in said substantially enclosed environment.

5. The method of claim 4 wherein said substantially enclosed environment is on an aircraft and said first mode further comprises:
releasing said hot stream into an exhaust duct of said heat exchanger to create a vacuum in said exhaust duct thus pulling cooling air across said heat exchanger even when said aircraft is not in flight.

6. The method of claim 5 comprising:
receiving said cooling air using an air scoop located on said aircraft for the purpose of driving said cooling air across said exchanger.

7. The method of claim 5 comprising:
providing a conduit for delivering said hot air stream, upon leaving said mechanism, into said exhaust duct; and
valving said conduit to enable switching between said first and second modes.

8. The method of claim 3 comprising:
providing a vortex tube to serve as said mechanism.

9. A cooling system for a pressurized aircraft cabin, the system comprising:
an engine having a compressor section;
a passageway for deriving bleed air from the compressor section and delivering the bleed air as a first medium into a heat exchanger;
a second medium deliverable across the heat exchanger, the second medium being received from a ram air source and exhausted out from the aircraft in an exhaust duct;
a vortex tube receiving the bleed air after the bleed air passes through the exchanger;
a first conduit emanating from the vortex tube and leading to the cabin;
a second conduit leading from the vortex cooler back to the exhaust duct, an exit end of the second conduit being bent to point out of the exhaust duct creating suction which draws said second medium across the heat exchanger;
a mode-control valve in said second conduit having a closed position wherein flow in the second conduit is shut off causing the bleed air to exit the vortex cooler to be delivered to the cabin in the first conduit as an undivided stream;
the mode-control valve having an open position where the bleed air is divided by the vortex cooler into a hot stream through the second conduit, and a cold stream into the first conduit; and
a pressure regulator in the passageway between the compressor section and the vortex cooler, the pressure regulator and vortex cooler each configured such that the regulated pressures create a substantially constant airflow into the cabin regardless of whether the mode-control valve is in the closed or open positions even when the aircraft is at altitude.

10. The system of claim 9 wherein an exit end of the second conduit includes an elbow that directs the hot steam into the exhaust duct in a direction away from the exchanger creating a vacuum in the exhaust duct which draws air across the exchanger even when the aircraft is not in flight.

11. The system of claim 10 comprising:
a first temperature sensor in the first conduit, and a second temperature sensor in cabin;
a controller receiving signals from said first and second sensors and being adapted to trigger the opening up of the mode control valve when the temperature exceeds a predetermined maximum.

12. The system of claim 11 wherein the mode-control valve is a poppet valve which is moved between the first and second positions using an electronic actuator.

13. The system of claim 11 wherein the flow rate of the second medium across the exchanger is adjustable using a butterfly valve which is operated according to signals received from the controller to further adjust the temperature of the bleed air being directed into the vortex cooler.

14. The system of claim 9 wherein the temperature difference created between the hot and cold streams is about 100° F. when the valve is in the open position.

15. The system of claim 9 wherein the temperature difference between each of the hot and cold streams versus a temperature of the bleed air introduced into the vortex cooler is about 50° F. when the valve is in the open position.

16. A method of air conditioning a pressurized aircraft cabin, the method comprising:
receiving bleed air from the compressor section of an engine and delivering at least some of the bleed air to the cabin;
maintaining the bleed air at a substantially constant pressure regardless of engine speed;
controlling the temperature of the bleed air using a heat exchanger;
receiving a cooling medium into an induction side of the exchanger and exhausting the cooling medium out from an exhaust side of the exchanger;
manipulating the flow rate of the cooling medium across the exchanger to drop the bleed air temperature to a desired setting using a temperature-controlling valve that is automatically adjusted based on temperature readings received from a sensor in the cabin;
using a vortex cooler to create a temperature drop in the bleed air temperatures by splitting the bleed air into a cold stream which is directed to the cabin, and diverting the hot stream into an exhaust duct on the exhaust side of the exchanger;
introducing the hot stream into the exhaust duct at a trajectory which creates suction on the exhaust side of the exchanger enabling the exchanger to pull the cooling medium across the exchanger to enable the temperature-controlling valve to adequately set temperatures; and
maintaining a substantially constant flow rate into the cabin regardless of engine speed by the maintaining of the pressure of the bleed air and by further sizing a supply orifice of the vortex cooler.

\* \* \* \* \*